Sept. 19, 1939.　　　　F. C. REED　　　　2,173,695
PROCESS OF PRODUCING CARBON BLACK AND CARBON
MONOXIDE-HYDROGEN GAS MIXTURES
Filed July 9, 1934
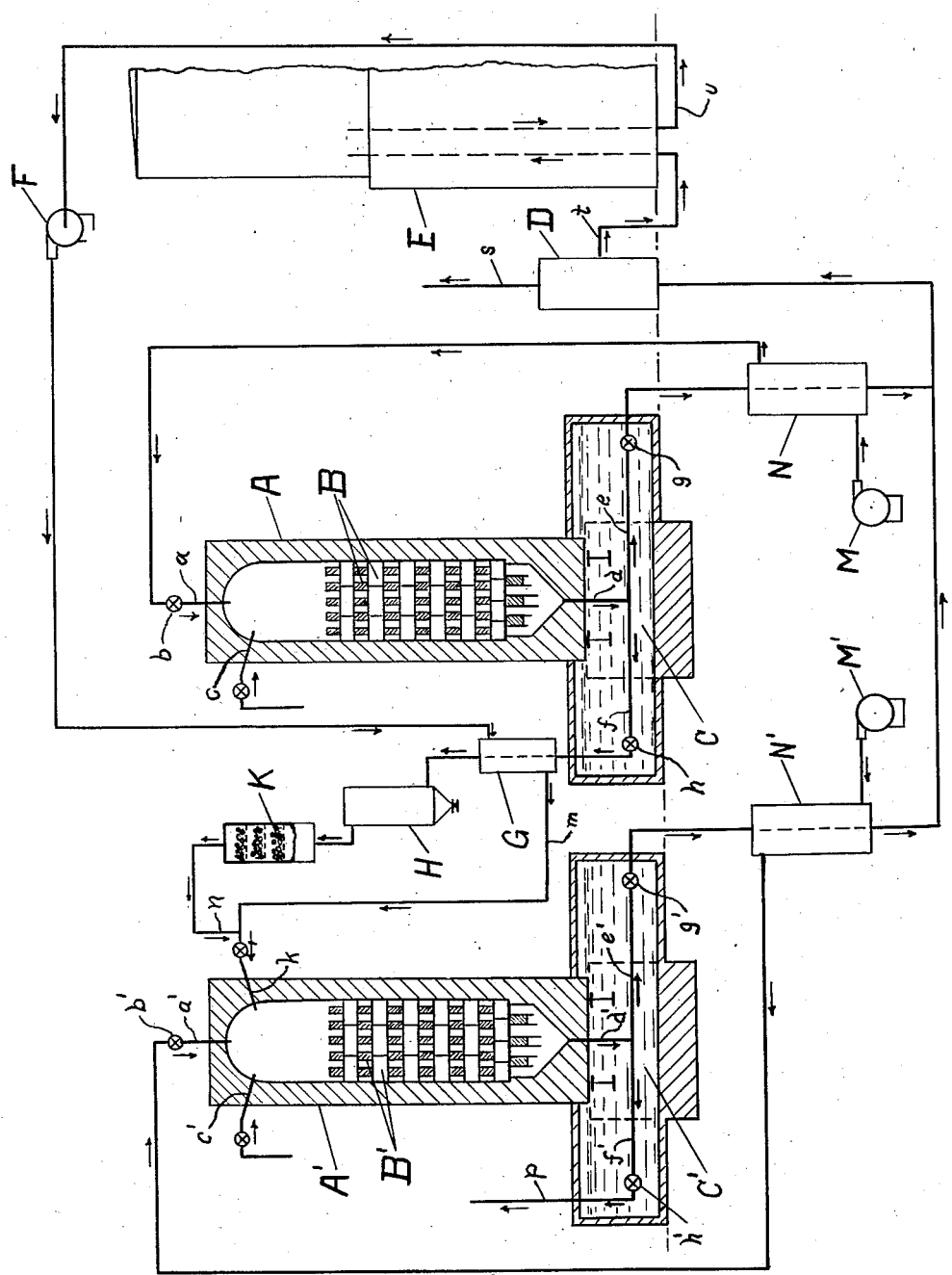
INVENTOR
Forrest C. Reed Patented Sept. 19, 1939

2,173,695

UNITED STATES PATENT OFFICE 2,173,695

PROCESS OF PRODUCING CARBON BLACK AND CARBON MONOXIDE-HYDROGEN GAS MIXTURES

Forrest C. Reed, Kansas City, Mo.

Application July 9, 1934, Serial No. 734,435

8 Claims. (Cl. 23—212)

This invention relates to the production of carbon black and gas mixtures of carbon monoxide and hydrogen, and more particularly to the production of said gas mixtures having a ratio of hydrogen to carbon monoxide greater than one and suitable for the synthetic production of compounds such as methanol where said ratio is substantially equal to two.

The object of the present invention is to devise an efficient method of producing said gas mixtures by the combustion and thermal dissociation of hydrocarbons such as natural gas, and at the same time to produce a high grade carbon black, and to attain other advantages as may be brought out in the specification and drawing.

It is known that gas mixtures of carbon monoxide and hydrogen can be produced by the dissociation of and reaction between methane and carbon dioxide either with or without a catalyst, but if the ratio of hydrogen to carbon monoxide to be produced is greater than one, there is an excess of free carbon produced, and if heavier hydrocarbons than methane are used with carbon dioxide, the free carbon produced is still greater. When the reaction is carried out in the presence of a catalyst, the free carbon clogs the catalyst, and when the reaction is carried out at high temperature without a catalyst, the quality of carbon is adversely affected by the prolonged exposure at the high temperatures required for reaction. An example of the foregoing is seen in the production of gases suitable for the production of methanol where the reaction is represented by the equation $$2CH_4 + CO_2 + Heat = 2CO + 4H_2 + C$$

It is also known that a gas mixture suitable for the production of methanol can be produced by reaction between methane, carbon dioxide and steam either with or without a catalyst and according to the equation $$1\tfrac{1}{2}CH_4 + \tfrac{1}{2}CO_2 + H_2O + Heat = 2CO + 4H_2$$

but this reaction absorbs a great amount of heat for the decomposition of the steam and, furthermore, the reaction is never complete. Another objection to the foregoing methods is the difficulty of producing pure methane.

The process of the present invention is carried out in two steps; the first step is carried out at the lower temperatures suitable for the production of high grade carbon black, while the second step is carried out at the higher temperatures suitable for complete reactions. In the first step, hydrocarbons are partially dissociated to produce a gas mixture of methane and hydrogen, the excess carbon resulting from this partial dissociation of hydrocarbons is separated from the gas mixture as carbon black, and the gas mixture is then preferably subjected to catalytic action to convert any unsaturated compounds present to methane. In the second step, carbon dioxide is added to said gas mixture of methane and hydrogen and the whole gas mixture subjected to high temperatures to produce the desired mixture of carbon monoxide and hydrogen. An example would be in the production of a gas mixture suitable for the production of synthetic methanol from a gas consisting substantially of methane, in which the first step would be represented by the equation $$2CH_4 + Heat = CH_4 + 2H_2 + C$$

After the separation of the carbon, the second step would be represented by the equation $$(CH_4 + 2H_2) + CO_2 + Heat = 2CO + 4H_2$$

One type of apparatus suitable for carrying out the process of the present invention is shown diagrammatically and partly in section in the accompanying drawing. A and A' are closed retorts capable of operating at high temperatures and suitable for alternating periods of heating and dissociation. B and B' are fillings of refractory material and shown here as checkerwork; $a$ and $a'$ are air inlet connections with valves $b$ and $b'$; $c$ and $c'$ are nozzles for admitting hydrocarbons to the retorts, $d$ and $d'$ are discharge pipe connections communicatively joined to pipes $e$ and $e'$, and $f$ and $f'$ respectively, and $g$, $g'$, $h$, and $h'$ are suitable valves. C and C' are water tanks for the partial cooling of the gases discharged from retorts. Retort A' is provided with a nozzle $k$ for admitting carbon dioxide with the methane and hydrogen discharged from retort A. A plurality of nozzles such as $k$, $c$, and $c'$ could as well be provided. M, M', and F are blowers, N, N', and G are heat exchangers, H is an electrical precipitator for separating carbon from the cracked gas leaving retort A, and K is a catalyst such as nickel and suitable for converting unsaturated compounds in the presence of hydrogen to methane. D is an apparatus suitable for the recovery of carbon dioxide from the gases of combustion by any of the well known methods, as, e. g., by absorption in a suitable absorbitant which can be regenerated by heat, or by the compression and liquefaction methods. E is a gas holder.

With the apparatus described the process may be carried out in the following manner: starting with the heating period, heated air for combustion is supplied simultaneously to retorts A and A' by blowers M and M' thru heat exchangers N and N' to inlet connections $a$ and $a'$ while hydrocarbons for combustion are admitted at $c$ and $c'$, the combustion proceeds over checkerwork B and B' and the gases resulting from combustion are discharged thru outlet connections $d$ and $d'$ into pipes $e$ and $e'$ respectively, where they are partially cooled in water tanks C and C' respectively, then passed in heat exchange with the air for combustion thru N and N' and thence to carbon dioxide separation apparatus D where the carbon dioxide is removed and passed thru pipe $t$ to gas holder E while the remaining gases of combustion, consisting mainly of nitrogen are discharged at $s$. The object of the partial cooling of the gas in tanks C and C' is to protect the valve $g$, $g'$, $h$, and $h'$ from excessive heat and to reduce the temperature of the gas to a point where it is practicable to use metal heat exchangers. The heating is continued until the checkerwork is heated to the temperature desired, and preferably about 1800° to 2000° F. for retort A and about 2400° to 2600° F. for retort A'.

When the heating period is thus completed, the valves are manipulated to change over to the dissociation period. The air supply to both retorts and the combustible gas supply to retort A' are stopped. Hydrocarbons are now admitted to retort A thru nozzle $c$ at a rate to give the desired ratio of methane to hydrogen in the gas leaving retort A, as, e. g., when producing a final gas mixture in retort A' suitable for the synthetic production of methanol, the rate should be such that the composition of the resulting partially cracked gas leaving retort A is substantially $CH_4+2H_2$, this gas mixture with the excess carbon produced is discharged at $d$ into pipe $f$ where the mixture is partially cooled in water tank C, then passed thru heat exchanger G to the electrical precipitator H where the carbon is removed and the remaining gas mixture passed on thru catalyst K where any unsaturated compounds present are hydrogenated to methane, the catalyst K is operated at a temperature of preferably about 550° F. The methane-hydrogen gas mixture leaving catalyst K thru pipe $n$, and carbon dioxide from pipe $m$, are passed to retort A' thru nozzle $k$, the carbon dioxide being drawn from gas holder E by blower F and passed thru heat exchanger G to pipe $m$. The partially cooled gases leaving retort A are thus utilized to preheat the carbon dioxide entering retort A' and since catalyst K is operated at an elevated temperature, the gas mixture entering retort A' thru nozzle $k$ is at a temperature sufficiently high to materially reduce the heat requirements for reaction in retort A'. The reaction taking place in heated retort A' is represented by the equation $(CH_4+2H_2)+CO_2=2CO+4H_2$. The carbon monoxide-hydrogen gas mixture thus produced is passed thru discharge pipe $d'$ to pipe $f'$ and thence out thru pipe $p$ to gas holder or other suitable storage.

When hydrocarbons such as natural gas are partially cracked there is always a small percentage of unsaturated compounds present in the cracked gas and usually amounting to about 3%, and in some natural gas there are small amounts of the oxides of carbon, and a catalyst such as nickel or cobalt and suitable for converting unsaturated compounds in the presence of hydrogen to methane will also convert the oxides of carbon to methane and water, therefore in carrying out the present process this water, if present, could be condensed and removed after catalyst K, but since in any event the amount would be very small and since the water would tend to react with methane in retort A' to form carbon monoxide and hydrogen, it would be preferable not to remove the water as the gas mixture would scarcely be altered by its presence and considerable heat is thereby saved.

With the checkerwork in retort A constructed of special units as described in my U. S. Patent 1,980,827, Nov. 13, 1934, practically all the excess carbon produced can be recovered as valuable carbon black. By carrying out the process in two steps as herein disclosed and by hydrogenating the unsaturated compounds formed in the first step to methane, it is possible to operate the first step at comparatively low temperatures suitable for the production of carbon black and to operate the second step at high temperatures suitable for the complete reaction required in producing gas mixtures of carbon monoxide and hydrogen. The value of the carbon black produced by the process of the present invention is sufficient to nearly pay for the cost of the carbon monoxide-hydrogen gas mixture produced. The preheating with heat exchange as herein disclosed furnishes an economical method of operation, and the partial cooling of the gases by liquid means makes possible the use of metal heat exchangers whereby a large portion of the heat usually wasted is saved by the operation of the present process. A further advantage gained by the present process is the ease and flexibility of operation afforded by the operation of the process in two steps where any desired ratio of hydrogen to methane can be produced in the first step, thereby permitting, in the second step, the production of any desired carbon monoxide-hydrogen gas mixture having a ratio of hydrogen to carbon monoxide greater than one.

Now while, as previously pointed out, the process of the present invention is particularly adaptable to the production of carbon monoxide-hydrogen gas mixtures having a ratio of hydrogen to carbon monoxide greater than one, as, e. g., a gas mixture consisting of $CO+2H_2$ and suitable for the synthetic production of methanol, yet, the present process is also useful for the production of gas mixtures consisting of substantially equal volumes of carbon monoxide and hydrogen $(CO+H_2)$ and suitable for the synthetic production of such compounds as formaldehyde and acetic acid. The latter gas mixture can be produced from equal volumes of carbon dioxide and methane according to the equation

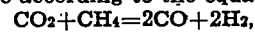
$$CO_2+CH_4=2CO+2H_2,$$

but hydrocarbons such as natural gas usually contain some heavier carbon compounds than methane which by the process of the present invention are dissociated to methane and hydrogen with the usual small percentage of unsaturated compounds and the free carbon, then after the removal of carbon these unsaturated compounds in the presence of hydrogen are hydrogenated to methane. There should be preferably a slight excess of hydrogen to insure the complete removal of unsaturated compounds, therefore the methane produced in the first step of the process will contain a very small amount of hydrogen but the final gas mixture produced in the second step of the process will consist of substantially equal volumes of carbon monoxide and hydrogen, as, e. g., when starting with a natural gas consisting of $85CH_4+15C_2H_6=100$ volumes, and assuming about 3% of unsaturates to be formed in the partial dissociation as before stated, then the process is carried out according to the following equations.

First step, carried out at about 1200° to 1600° F. in retort A, $$85CH_4+15C_2H_6+Heat=\\100CH_4+(3C_2H_4+9H_2+9C)$$

Reaction over hydrogenating catalyst after the removal of carbon, $$100CH_4+(3C_2H_4+9H_2)=106CH_4+3H_2$$

Second step, carried out at about 2400° to 2600° F. in retort A', $$106CO_2+(106CH_4+3H_2)+Heat=212CO+215H_2$$

There are other modifications possible in carrying out the process of the present invention, as, e. g., an electrical precipitator has been considered herein for the removal of carbon, yet other suitable means such as filters could as well be used for this purpose, and either the electrical precipitator or filters could be preceded by other separating means such as the well known cyclone type of dust collectors for removing the coarser carbon and thereby grading the carbon to some extent. The process could as well be carried out with carbon dioxide supplied from a source independent of the process, but the method herein described for removing carbon dioxide from the gases of combustion furnishes an ideal combination because the carbon dioxide from the heating gases of both retorts is just about equal to the requirements of the process.

Obviously there are other methods of carrying out the process of the present invention without departing from the spirit and scope of the present invention and I do not wish to be understood as limiting myself except by the following claims when construed in the light of the prior art.

What I claim is:

1. The process of producing carbon monoxide-hydrogen gas mixtures, which comprises alternating the periods of combustion and dissociation of hydrocarbons within closed retorts, separating carbon dioxide from the gases of combustion, subjecting hydrocarbons to dissociating temperatures during said dissociating periods for producing a gas mixture of methane and hydrogen, utilizing said carbon dioxide to cool the products of dissociation by heat exchange therewith, catalyzing any unsaturates present to methane, then adding said carbon dioxide to said methane and hydrogen and subjecting the resultant mixture to high temperatures to produce said carbon monoxide-hydrogen gas mixtures.

2. The process of producing a gas mixture of substantially equal volumes of carbon monoxide and hydrogen, which comprises dissociating the heavier hydrocarbons than methane from a mixture of methane and heavier hydrocarbons, separating carbon therefrom, then hydrogenating unsaturated compounds to methane, and then subjecting carbon dioxide with the gas thus produced and consisting substantially of methane to high temperatures while regulating the supply of the gases and the temperature conditions for producing a gas mixture of substantially equal volumes of carbon monoxide and hydrogen.

3. The process of producing a carbon monoxide-hydrogen gas mixture, which consists in dissociating hydrocarbons to produce a gas mixture of methane and hydrogen, catalyzing any unsaturates present to methane, and then adding carbon dioxide to said mixture and subjecting the resultant mixture to high temperatures while regulating the rate of supply of the gases and the temperature conditions to produce a carbon monoxide-hydrogen mixture having a ratio of the hydrogen to the carbon monoxide greater than one.

4. The process of producing a carbon monoxide-hydrogen gas mixture, which consists in dissociating hydrocarbons to produce a gas mixture of methane and hydrogen, cooling said mixture and converting any unsaturates present in the mixture to methane, and then adding carbon dioxide to the mixture and subjecting the resultant mixture to high temperatures while regulating the rate of supply of the gases and the temperature conditions to produce a carbon monoxide-hydrogen mixture having a ratio of the hydrogen to the carbon monoxide greater than one.

5. The process of producing a carbon monoxide-hydrogen gas mixture, which consists in heating a closed retort by a combustion step, then dissociating hydrocarbons within the retort to produce a gas mixture of methane and hydrogen, then cooling said mixture by heat exchange with carbon dioxide recycled from said combustion step and converting any unsaturates present to methane, and then adding said carbon dioxide to the mixture and subjecting the resultant mixture to high temperatures while regulating the rate of gas supply and temperature conditions to produce a carbon monoxide-hydrogen mixture having a ratio of the hydrogen to the carbon monoxide greater than one.

6. The process of producing carbon and a carbon monoxide-hydrogen gas mixture, which consists in heating a closed retort by a combustion step, then dissociating hydrocarbons within the retort to produce carbon and a gas mixture of methane and hydrogen and separating the carbon therefrom, and converting any unsaturates present in the mixture to methane, and then adding to the mixture carbon dioxide recycled from the combustion step and subjecting the resultant mixture to high temperatures while regulating the rate of gas supply and temperature conditions to produce a carbon monoxide-hydrogen mixture having a ratio of the hydrogen to the carbon monoxide greater than one.

7. The process of producing carbon black and a carbon monoxide-hydrogen gas mixture having a ratio of hydrogen to carbon monoxide greater than one, which consists in dissociating, at high temperature and in the absence of steam and air, a gas consisting of substantially all hydrocarbons to produce carbon black and a gas mixture of methane and hydrogen having a ratio of hydrogen to methane greater than one, then separating the carbon black at lowered temperature and catalyzing any unsaturates present in the mixture to methane, then subjecting said mixture of methane and hydrogen together with a volume of carbon dioxide equal to the volume of said methane to the dissociating temperature of methane whereby said methane and carbon dioxide and hydrogen are reformed to a gas mixture of carbon monoxide and hydrogen having a ratio of hydrogen to carbon monoxide greater than one.

8. The process of producing carbon black and a carbon monoxide-hydrogen gas mixture, which consists in dissociating, at elevated temperatures and in the absence of steam and air, the heavier hydrocarbons than methane from a gas mixture of methane and heavier hydrocarbons to produce carbon black and a gas mixture of methane and hydrogen having a ratio of hydrogen to methane greater than one, then at lowered temperature separating the carbon black and then hydrogenating any unsaturates left in the mixture to methane, and then subjecting the resultant gas mixture together with carbon dioxide to the dissociating temperature of methane while regulating the volume of carbon dioxide to an amount sufficient to react with the methane and thereby reform the mixture to a gas mixture of carbon monoxide and hydrogen.

FORREST C. REED.